(12) United States Patent
Roeckelein et al.

(10) Patent No.: US 7,467,105 B2
(45) Date of Patent: Dec. 16, 2008

(54) PRICE CALCULATOR

(75) Inventors: Markus Roeckelein, Angelbachtal (DE); Gordon Seiffart, Dossenheim (DE); Michael Jaehnisch, Heidelberg (DE)

(73) Assignee: SAP AG, Walldorf (DE)

( * ) Notice: Subject to any disclaimer, the term of this patent is extended or adjusted under 35 U.S.C. 154(b) by 840 days.

(21) Appl. No.: 10/856,660

(22) Filed: May 28, 2004

(65) Prior Publication Data

US 2005/0267838 A1 Dec. 1, 2005

(51) Int. Cl.
*G06Q 40/00* (2006.01)
(52) U.S. Cl. .................................... 705/35; 705/36 R
(58) Field of Classification Search .................. 705/35, 705/36 R
See application file for complete search history.

(56) References Cited

U.S. PATENT DOCUMENTS

| | | | | |
|---|---|---|---|---|
| 6,772,136 | B2 * | 8/2004 | Kant et al. ..................... | 706/50 |
| 7,305,362 | B2 * | 12/2007 | Weber et al. ............... | 705/36 R |
| 2003/0093351 | A1 * | 5/2003 | Sarabanchong .............. | 705/36 |
| 2003/0130917 | A1 * | 7/2003 | Crovetto ...................... | 705/35 |
| 2003/0172014 | A1 * | 9/2003 | Quackenbush et al. ........ | 705/35 |
| 2003/0177077 | A1 * | 9/2003 | Norman ........................ | 705/35 |
| 2003/0187772 | A1 * | 10/2003 | Papka ........................... | 705/36 |
| 2004/0117282 | A1 * | 6/2004 | Green et al. ................... | 705/35 |
| 2004/0172355 | A1 * | 9/2004 | Pandher ........................ | 705/37 |
| 2005/0021435 | A1 * | 1/2005 | Hakanoglu et al. ............ | 705/36 |
| 2005/0261998 | A1 * | 11/2005 | Possolo et al. ................ | 705/35 |
| 2006/0195345 | A1 * | 8/2006 | Close et al. .................... | 705/7 |
| 2006/0200772 | A1 * | 9/2006 | Dhanapal et al. ............ | 715/760 |
| 2007/0043654 | A1 * | 2/2007 | Libman ........................ | 705/38 |

* cited by examiner

*Primary Examiner*—Jagdish N Patel
*Assistant Examiner*—Sara Chandler
(74) *Attorney, Agent, or Firm*—Kenyon & Kenyon LLP

(57) ABSTRACT

A method is provided for calculating a price of a financial instrument that includes obtaining parameters of the financial instrument from a financial database of transactions and determining the price based on a projection using the parameters. The method may further include selecting a model for determining the price and determining the price using the model and the parameters. The method may further include selecting at least one further model for calculating the price and determining the price using the at least one further model and the parameters. A system is provided for calculating a price of a financial instrument comprising parameters for the financial instrument and a processor in electronic communication with the financial database and adapted to calculate the price of the financial instrument based on a projection and the parameters. A computer program is provided that is stored on a memory and configured to be executed by a computer. The computer program includes program code for executing a method for pricing a financial transaction.

15 Claims, 2 Drawing Sheets

PRICE CALCULATOR

FIELD OF THE INVENTION

The present invention relates to computer software. More particularly, the present invention relates to a program for calculating the price of financial instruments by various methods.

BACKGROUND INFORMATION

A bank analyzer application may be used by banks or financial institutions and may use or need a price for a financial instrument. The price of financial instruments may be calculated by various methods. Additionally, a financial instrument may be priced by one method and later by another method. Multiple valuations of the same financial instrument may be necessary because of changed terms (e.g., interest rates), changed circumstances (e.g., risk), and/or the failure of some models to provide an appropriate price for the financial instrument.

In Germany, for example, homeowners have the right to change the interest rates of their mortgages 10 years after the loan begins. Therefore, a bank in Germany may want to run scenarios with various interest rate assumptions and determine how they would affect the value of a given batch of loans.

There thus is a need for a method of enabling banks to easily price financial instruments, multiple times, using projections, models, and customized models.

DETAILED DESCRIPTION

A price calculator may permit a bank to perform scenario modeling on a contract or a group of contracts (also referred to herein as financial instruments, financial transactions, instruments, or transactions). There are two stages of calculation in the price calculator: the projection stage and the valuation stage. Projection is the act of extracting data which is relevant for valuation from a given transaction (for example, a loan or a bond). Valuation involves determining a price according to a specific model. There are a variety of models for evaluating different contracts. The models themselves may be conventional.

Figure 1:
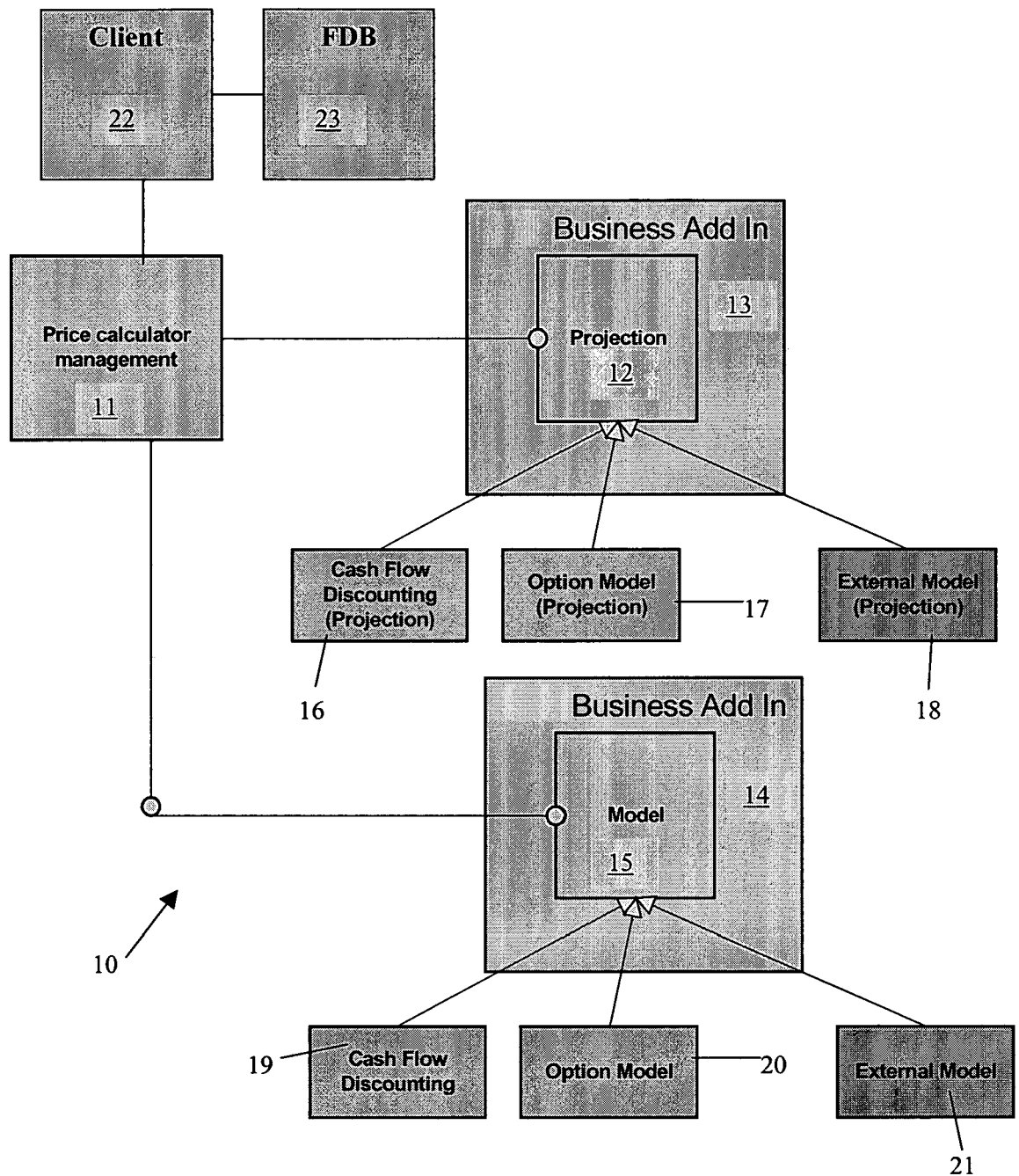
FIG. 1 illustrates an exemplary architecture of an exemplary embodiment of the present invention.

FIG. 1 illustrates an exemplary architecture of an exemplary embodiment of the present invention. A bank analyzer may include FDB 23 (also referred to herein as a financial database) and price calculator 10. FDB 23 may store all information regarding the loans and other instruments that the bank analyzer services. Client 22 in FIG. 1 may be an analyzer within the bank analyzer (for example the balance analyzer). Client 22 retrieves the parameters of the instruments from FDB 23 and passes them to price calculator management 11.

The data may flow in the following manner through price calculator 10. Client 22 may call price calculator 10 and pass parameter data. The model for valuation is derived from the parameters of the instrument and is determined within price calculator management 11. Price calculator 10 may perform a projection of the instrument based on the parameter data, and may evaluate contracts by its present terms. Price calculator 10 may call the customer-defined model through a "Business Add In" (BAdI) interface.

The integration of external models into price calculator 10 may operate seamlessly by using Business Add In technology. The concept behind Business Add In technology is the interfacing of object oriented software development. With this technology, it is possible for users of the software to allow their own coding to run within the system without changing the system that is shipped by the software company. The effect of the introduction of an interface is a decoupling between price calculator management 11 and its servers (in this case projection 12 and model 15). Decoupling means that price calculator management 11 may only know about an abstract definition of the interface. This abstract definition may not change when new implementations are added. All implementations may appear at runtime as the same interface, which may be known to price calculator management 11.

Price calculator management 11 may call either of BAdI projection interface 13 and BAdI model interface 14. BAdI projection interface 13 includes projection 12 and BAdI model interface 14 includes model 15. Projection 12 may access any of several different projection models (also referred to herein as implementations), including cash flow discounting projection 16, option model projection 17, external model projection 18, and/or any other appropriate projection. A user may add external projections (also referred to herein as implementations) that could be accessed by projection 12. Any of the different projection models may access external data, either directly to FDB 23 (via client 22) or through price calculator management 11.

Model 15 may access any of several different projection models, including cash flow discounting 19, option model 20, external model 21, and/or any other appropriate model. A user may add external models that could be accessed by model 15. Any of the different models (also referred to herein as implementations) may access external data, either directly to FDB 23 (via client 22) or through price calculator management 11.

Implementations of the projection and the model may be grouped pair-wise through a common so-called filter value. The filter value may therefore identify the valuation method (through a projection and a model) of an instrument. For a given instrument, an ordered list of filter values may be derived, indicating the sequence of valuation methods that should be applied to the instrument. For instance, if an exchange-traded option indicates that the mark to market method should be used first, and then the option model if necessary, then the option model may possibly be used in this situation (i.e., the option price is determined according to the Black-Scholes model) if the market price of the option could not be accessed directly.

Price calculator 10 may have at least two BAdI interfaces, for instance BAdI projection interface 13 including projection 12 and BAdI model interface 14 including model 15. BAdI model interface 13 may receive data about the financial instrument. Each projection may be a technical implementation of this interface and may extract the information from the instrument according to the model to which it belongs. Implementations of the model interface may receive the projected data from the instrument and further data for valuation (dates, market data, etc.) and determine the price within the model. Customers may also implement these interfaces when introducing their proprietary valuation models. New models may be implemented by a user and then may be seamlessly integrated into price calculator 10 by means of the Business Add In technology.

If one type of evaluation fails, price calculator 10 may invoke another model, which may be indicated from the parameter data. Additionally, price calculator 10 may perform different valuations using different scenarios. Modeling may be performed using various scenario assumptions or based on benchmarks received from an external source (i.e., external market data, for example, historical trends in interest rates). Price calculator 10 may interface with other services to obtain information necessary to valuation or modeling. For example, when valuing a stock option, price calculator 10 may refer to exchanges to determine a trading value of the stock. Price calculator 10 may refer to financial database (FDB) 23 for historical interest rate information.

Price calculator 10 may project the value once for a particular transaction, but then model a value of the transaction several times (for different key dates, for example). This feature may provide several performance advantages. Lists of models may be applied sequentially to value instruments. If a model fails to determine a price, the next model in the list may be chosen.

Each valuation model may be represented by a pair of implementations, a projection and a model. These are identified via so-called filter values. As these filter values represent the different valuation models, the list of possible valuation models for a given instrument consists of a list of these values. For each instrument, the projection associated with the filter value is called once. Afterwards, the pertaining model is called and determines the price, possibly for several dates and market data scenarios.

The split of a valuation model into a projection and a model recognizes that the data for financial instruments and transactions that is stored in the financial database may be mostly superfluous for evaluating the financial transaction by a given model. For example, for valuing a position of bonds at a nominal value of 1000 USD, only the ID of the bond may be needed when marking to market, whereas only the cash flows of the bond may be needed when determining the price by discounting the cash flows according to a yield curve. In the financial database, there may be much more information stored, such as the issuer of the bond, issue amount, quotation information, maturity dates, etc. Much of this information may not be necessary for valuing the bond according to a model.

Therefore, projecting the instrument initially provides the essential information for the valuation method. Once the data is projected, the valuation may take place several times. For example, the cash flows may be discounted to any evaluation date without selecting and projecting the instrument data again. Alternatively, different market data scenarios may be applied to the market data (for instance, the yield curve) and the discounting may take place under these scenarios. Another advantage of doing the projection is that the data may be reused.

The feature of the decoupling between price calculator management 11 and its servers allows price calculator management 11 to not have any specific coding related to any of the valuation models. This ensures that new models may be introduced by simply implementing Business Add In projection 13 and Business Add In model 14. Price calculator management 11 may only need to know about the previously mentioned filter value in order to call a specific valuation model. This filter value may be read from a database table that is updated when implementing the new valuation model.

Figure 2:
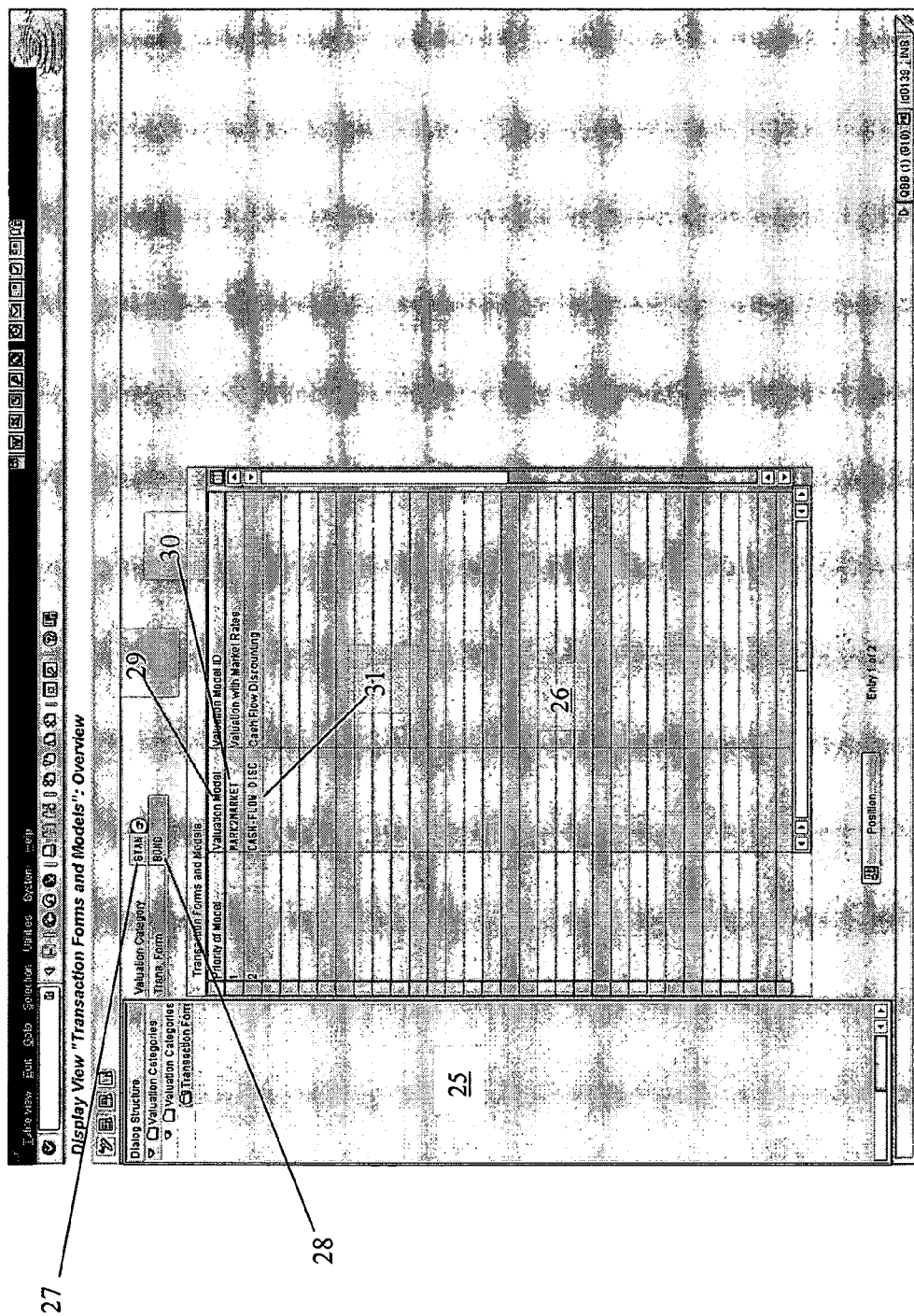
FIG. 2 illustrates a display image of an exemplary embodiment of the present invention.

FIG. 2 illustrates a screenshot of the customizing function for the valuation that allows the user to decide on the valuation (for example, mark to market, cash flow discounting, option pricing, etc.) for the calculation of the price of an instrument. Display 24 is divided into dialog sidebar 25 and settings display 26. In dialog sidebar 25, a tree hierarchy is shown. In settings display 26, transaction form 28 of valuation category 27 is displayed. For each instrument (in this case a bond), transaction form 28 is derived, to which valuation model list 29 is assigned within valuation category 27. Here, two models, 'mark to market' 30 and 'cash flow discounting' 31, are chosen, where the priority of the models is such that initially, valuation takes place according to mark to market 30 and, if this methods fails, cash flow discounting 31 is applied. The valuation models of valuation model list 29 refer directly to the filter values of the implementations of the projection and the model interfaces.

The price calculator may determine net present values (NPVs) and other figures related to financial transactions and positions. These figures may include the accrued interest, clean price, as well as durations and deltas of options. The price calculator may be one of the general methods in a bank analyzer in the risk basis area. It may be available to various other analyzer functions. A strategy analyzer and a balance analyzer may use the price calculator, for example, to value transactions for their evaluations.

The analyzer may call up the price calculator either directly or from a secondary data source. For instance, a strategy analyzer may call up the price calculator directly, for example, while a balance analyzer may call it up from the secondary data source. If the price calculator is called up directly, the system may read the customizing settings in the price calculator environment. If it is called up from a secondary data source, the extended price calculator environment may be used.

The price calculator can also process NPVs from a source system that is stored in the finanacial database as positions. External valuation models may be incorporated in the price calculator using Business Add-In interfaces. Within valuation models, external price calculators may be called using an RFC destination. RFC stands for 'remote function call', which means calling functions of a system other than the bank analyzer from the bank analyzer. When implementing external models, customers can perform such calls in order to reuse existing systems.

The price calculator is provided with all the external market data from the FDB. If an application supplies the price calculator with market data scenarios, the price calculator may calculate the NPV key figures on the basis of these scenarios.

To value transactions and positions, the price calculator may use several valuation models. Each of these valuation models is suitable for particular transaction forms only. Depending on the valuation model, the price calculator may determine a suitable selection of the following key figures: NPV, accrued interest, clean price, modified duration, convexity, price value of one basis point, Macaulay duration, delta of an option, gamma of an option, vega of an option, and amortized cost.

The price calculator may be provided with a market data scenario. The price calculator may then value a transaction using the parameters defined in the market data scenario. If no scenario is specified, the price calculator may use the market data valid on the evaluation date.

The price calculator may process various valuation models. Each of these models may be suitable for particular transactions only. A transaction form can usually be valued with several valuation models. For example, bonds can be valued with the mark-to-market valuation model (if price information is available) or by discounting the cash flow (theoretical price). The sub-transactions of a transaction can also be valued using different valuation models. The price calculator may be customized by setting which valuation model the price calculator uses for which transaction form.

The price calculator may then start by using the valuation model with the highest priority for the transaction form. If the valuation with this model fails, the price calculator may then use the valuation model with the next highest priority. Different modeling techniques may be assigned to a given transaction or bundle of transactions according to a user input. One or a plurality of modeling techniques may be identified (e.g., "use mark to market model first, but if the results are not available, then use cash flow discounting"). Additionally, customer-defined modeling techniques may be integrated into the price calculator.

While the present invention has been described in connection with the foregoing representative embodiment, it should be readily apparent to those of ordinary skill in the art that the representative embodiment is exemplary in nature and is not to be construed as limiting the scope of protection for the invention as set forth in the appended claims.

What is claimed is:

1. A method for calculating an estimated value for a financial instrument on a computer, comprising:
   inputting into the computer a type for the financial instrument;
   defining an ordered list of financial evaluation models for the type of the financial instrument;
   retrieving, by the computer, said financial evaluation models in accordance with the ordered list; and
   determining by the computer an estimated value for the financial instrument by executing the financial evaluation models in order of priority determined by the ordered list on the financial instrument until a valid estimated value for the financial instrument is calculated therefrom, wherein the executing comprises:
      retrieving a projection defined for the respective financial evaluation model,
   the projection identifying parameter data of the financial instrument for the respective financial evaluation model,
      retrieving the parameter data from the financial instrument using the projection,
      executing the respective financial evaluation model using the retrieved parameter data as an input, the execution determining an estimated value for the financial instrument, and
      if the estimated value for the respective financial evaluation model is a valid estimated value for the financial instrument, then outputting the estimated value for the financial instrument.

2. The method of claim 1, further comprising,
   presenting a user interface including a plurality of financial evaluation model types;
   responsive to the selection of one of the plurality of financial evaluation model types, presenting a plurality of financial evaluation models applicable for the selected type; and
   responsive to the selection of a financial evaluation model, adding the financial evaluation model to the list of financial evaluation models corresponding to the selected type.

3. The method of claim 1, wherein executing the respective financial evaluation model further comprises:
   retrieving current market data;
   executing the respective financial evaluation model with the retrieved parameter data and the retrieved current market data.

4. The method of claim 1, wherein executing the respective financial evaluation model further comprises:
   responsive to the selection of a financial assumption;
   executing the respective financial evaluation model with the retrieved parameter data and the selected financial assumption.

5. The method of claim 1, wherein determining an estimated value further comprises:
   for each of a plurality of dates, determining an estimated value for the financial instrument by executing the financial evaluation models in order upon the financial instrument until a valid estimated value is calculated therefrom.

6. A computer-readable storage medium storing a plurality of instructions which, when executed by a processor, cause the processor to perform a method comprising:
   inputting into the computer a type for a financial instrument;
   defining an ordered list of financial evaluation models for the type of the financial instrument;
   retrieving, by the computer, said financial evaluation models in accordance with the ordered list; and
   determining by the computer an estimated value for the financial instrument by executing the financial evaluation models in order of priority determined by the ordered list on the financial instrument until a valid estimated value for the financial instrument is calculated therefrom, wherein the executing comprises:
      retrieving a projection defined for the respective financial evaluation model,
      the projection identifying parameter data of the financial instrument for the respective financial evaluation model,
      retrieving the parameter data from the financial instrument using the projection,
      executing the respective financial evaluation model using the retrieved parameter data as an input, the execution determining an estimated value for the financial instrument, and
      if the estimated value for the respective financial evaluation model is a valid estimated value for the financial instrument, then outputting the estimated value for the financial instrument.

7. The computer-readable storage medium of claim 6, further comprising,
   presenting a user interface including a plurality of financial evaluation model types;
   responsive to the selection of one of the plurality of financial evaluation model types, presenting a plurality of financial evaluation models applicable for the selected type; and
   responsive to the selection of a financial evaluation model, adding the financial evaluation model to the list of financial evaluation models corresponding to the selected type.

8. The computer-readable storage medium of claim 6, wherein executing the respective financial evaluation model further comprises:
   retrieving current market data;
   executing the respective financial evaluation model with the retrieved parameter data and the retrieved current market data.

9. The computer-readable storage medium of claim 6, wherein executing the respective financial evaluation model further comprises:
   responsive to the selection of a financial assumption;

executing the respective financial evaluation model with the retrieved parameter data and the selected financial assumption.

10. The computer-readable storage medium of claim 6, wherein determining an estimated value further comprises:
for each of a plurality of dates, determining an estimated value for the financial instrument by executing the financial evaluation models in order upon the financial instrument until a valid estimated value is calculated therefrom.

11. A system comprising:
a storage unit to store instructions; and
a processing unit to:
input into the computer a type for a financial instrument;
define an ordered list of financial evaluation models for the type of the financial instrument;
retrieve, by the computer, said financial evaluation models in accordance with the ordered list; and
determine by the computer an estimated value for the financial instrument by executing the financial evaluation models in order of priority determined by the ordered list on the financial instrument until a valid estimated value for the financial instrument is calculated therefrom, wherein the executing comprises:
retrieve a projection defined for the respective financial evaluation model,
the projection identifying parameter data of the financial instrument for the respective financial evaluation model,
retrieve the parameter data from the financial instrument using the projection,
execute the respective financial evaluation model using the retrieved parameter data as an input, the execution determining an estimated value for the financial instrument, and
if the estimated value for the respective financial evaluation model is a valid estimated value for the financial instrument, then output the estimated value for the financial instrument.

12. The system of claim 11, the processing unit further to:
present a user interface including a plurality of financial evaluation model types;
responsive to the selection of one of the plurality of financial evaluation model types, present a plurality of financial evaluation models applicable for the selected type; and
responsive to the selection of a financial evaluation model, adding the financial evaluation model to the list of financial evaluation models corresponding to the selected type.

13. The system of claim 11, wherein execute the respective financial evaluation model further comprises:
retrieve current market data;
execute the respective financial evaluation model with the retrieved parameter data and the retrieved current market data.

14. The system of claim 11, wherein execute the respective financial evaluation model further comprises:
responsive to the selection of a financial assumption;
execute the respective financial evaluation model with the retrieved parameter data and the selected financial assumption.

15. The system of claim 11, wherein determine an estimated value further comprises:
for each of a plurality of dates, determine an estimated value for the financial instrument by executing the financial evaluation models in order upon the financial instrument until a valid estimated value is calculated therefrom.

* * * * *